United States Patent
Hoecker et al.

(10) Patent No.: US 11,404,723 B2
(45) Date of Patent: Aug. 2, 2022

(54) SILYL ESTER PHOSPHINATES AS ELECTROLYTE ADDITIVES

(71) Applicant: BASF SE, Ludwigshafen am Rhein (DE)

(72) Inventors: Johannes David Hoecker, Ludwigshafen (DE); Manuel Alejandro Mendez Agudelo, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 255 days.

(21) Appl. No.: 16/334,178

(22) PCT Filed: Sep. 19, 2017

(86) PCT No.: PCT/EP2017/073673
§ 371 (c)(1),
(2) Date: Mar. 18, 2019

(87) PCT Pub. No.: WO2018/054919
PCT Pub. Date: Mar. 29, 2018

(65) Prior Publication Data
US 2019/0207260 A1    Jul. 4, 2019

(30) Foreign Application Priority Data

Sep. 21, 2016  (EP) .................................... 16189962

(51) Int. Cl.
| | |
|---|---|
| H01M 10/0567 | (2010.01) |
| H01M 10/0525 | (2010.01) |
| H01M 10/0568 | (2010.01) |
| H01M 10/0569 | (2010.01) |
| C07F 9/48 | (2006.01) |
| C07F 9/6596 | (2006.01) |
| C07F 9/141 | (2006.01) |
| H01M 10/052 | (2010.01) |
| C07F 9/535 | (2006.01) |
| C07F 9/70 | (2006.01) |
| C01B 25/00 | (2006.01) |
| C07F 9/90 | (2006.01) |

(52) U.S. Cl.
CPC ......... *H01M 10/0567* (2013.01); *C01B 25/00* (2013.01); *C07F 9/1415* (2013.01); *C07F 9/4866* (2013.01); *C07F 9/535* (2013.01); *C07F 9/6596* (2013.01); *C07F 9/70* (2013.01); *C07F 9/90* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0034* (2013.01)

(58) Field of Classification Search
CPC .. H01M 10/0567; H01M 4/505; H01M 4/525; H01M 4/5825; H01M 10/0525; H01M 4/136; H01M 4/131; H01M 2004/028; H01M 2300/0025; H01M 10/052; Y02E 60/10

See application file for complete search history.

(56) References Cited

U.S. PATENT DOCUMENTS

| | | | |
|---|---|---|---|
| 8,993,158 B2 | 3/2015 | Kobayashi et al. | |
| 2012/0244419 A1 | 9/2012 | Kwak et al. | |
| 2013/0071732 A1 | 3/2013 | Kobayashi et al. | |
| 2013/0164604 A1* | 6/2013 | Matsumoto | H01M 10/0569 429/163 |
| 2015/0099193 A1* | 4/2015 | Hamasaki | H01M 4/505 429/338 |
| 2017/0040649 A1 | 2/2017 | Schmitz et al. | |

FOREIGN PATENT DOCUMENTS

| | | | | |
|---|---|---|---|---|
| DE | 242 810 A1 | 2/1987 | | |
| EP | 2 503 633 A2 | 9/2012 | | |
| EP | 2 573 854 A1 | 3/2013 | | |
| JP | 2015-097179 A | 5/2015 | | |
| JP | 2015097179 A * | 5/2015 | ........ | H01M 10/0525 |
| WO | WO 2013/026854 A1 | 2/2013 | | |
| WO | WO 2015/158755 A1 | 10/2015 | | |

OTHER PUBLICATIONS

International Search Report dated Nov. 14, 2017 in PCT/EP2017/073673 filed Sep. 19, 2017.
Prishchenko, A. A., et al., "Synthesis and Reactivity of Alkoxy (trimethylsiloxy) phosphines and Their Derivatives," Heteroatom Chemistry, vol. 23, No. 2, Nov. 10, 2011, pp. 138-145, XP055420408.
Extended European Search Report dated Nov. 25, 2016 in Patent Application No. 16189962.0, 3 pages.
Ran Elazari, et al., "Rechargeable Lithiated Silicon-Sulfur (SLS) Battery Prototypes" Electrochemistry Communications, vol. 14, Issue 1, Jan. 2012, pp. 21-24.
Gennady M. Kosolapoff, et al., "Association Phenomena in Some Organophosphorus Compounds" Journal of the American Chemical Society, vol. 72, Issue 9, 1950, pp. 4291-4292.
Marios S. Markoulides, et al., "Synthesis of Phosphinate Analogues of the Phospholipid Anti-Tumour Agent Hexadecylphosphocholine (Miltefosine)" Tetrahedron Letters, vol. 52, Issue 23, Jun. 8, 2011, pp. 2954-2956.

(Continued)

*Primary Examiner* — Muhammad S Siddiquee
(74) *Attorney, Agent, or Firm* — Lowenstein Sandler LLP

(57) ABSTRACT

A non-aqueous electrolyte composition containing (i) at least one aprotic organic solvent; (ii) a compound of formula (I) (iii) at least one ion containing conducting salt; and (iv) optionally one or more additives.

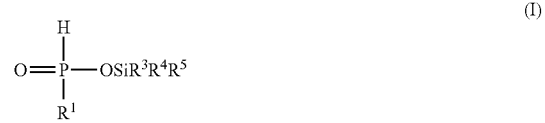

8 Claims, No Drawings

(56) References Cited

OTHER PUBLICATIONS

Norbert Weferling, et al., "Über die Reaktion einiger P(III)-OSiMe$_3$-Verbindungen mit Hexafluoraceton / Reaction of Some P(III)-OSiMe$_3$ Compounds with Hexafluoroacetone" Zeitschrift für Naturforschung B: A Journal of Chemical Sciences, vol. 43, Issue 12, 1988, pp. 1524-1528.

\* cited by examiner

SILYL ESTER PHOSPHINATES AS ELECTROLYTE ADDITIVES

The present invention relates to the use of silyl ester phosphinates in electrolyte compositions and to electrolyte compositions and electrochemical cells containing such silyl ester phosphinates.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and so called film forming additives which react during first charge/discharge cycle on the electrode surface thereby forming a film on the electrode. Recently novel electrolyte additives were developed based on P-containing acid derivatives comprising additional functional groups.

U.S. Pat. No. 8,993,158 B2 discloses electrolyte compositions for use in lithium ion batteries comprising silyl ester group-containing phosphonic acid derivatives to inhibit increase of the battery resistance and deterioration of the battery performance in a high-temperature environment.

Novel cathode active materials are used for increasing the performance of lithium batteries. These cathode active materials have higher specific energies and/or higher working voltages. Examples of such cathode active materials are high energy NCM (lithiated mixed oxides of Ni, Co and Mn, so-called HE-NCM), high voltage manganese spinels with layer structure containing additional transition metals, and lithium nickel cobalt aluminium oxides (also named NCA). For some of these cathode active materials high cut-off voltages have to be used during charging to obtain the desired high specific energies. These cathode active materials place new demands on the electrolyte compositions used, e.g. in regard to stability towards high voltage, $O_2$ release, dissolution of transition metal cations from the cathode active material, gas evolution upon storage, etc.

There is still the need for improving the performance and the safety of electrochemical cells, in particular the performance of electrochemical cells comprising the afore-mentioned high energy/high voltage cathode materials, e.g. in respect to high capacity retention, good long-term performance, low gas evolution, and low impedance build-up.

It is an objective of the present invention to provide additives for use in electrochemical cells to improve the performance and safety of the electrochemical cells, e.g. in respect to high capacity retention, good long-term performance, storability, high temperature behaviour, high safety, low gas evolution, and low impedance build-up. In particular additives should be provided to improve the performance of electrochemical cells comprising cathode active materials having high specific energies and/or high working voltages. It is another object of the invention to provide electrolyte compositions for electrochemical cells, resulting in electrochemical cells with high capacity retention, good long-term performance and high safety. The electrolyte composition should in particular be suited for the use with cathode active materials having high specific energies and/or high working voltages. It is also an object of the present invention to provide electrochemical cells showing overall good capacity retention, good long-term performance, good storability and high temperature behaviour, high safety, low gas evolution, and low impedance build-up.

Accordingly, non-aqueous electrolyte compositions are provided containing
(i) at least one aprotic organic solvent;
(ii) a silyl ester phosphinate;
(iii) at least one lithium ion containing conducting salt; and
(iv) optionally one or more additives.

Furthermore, electrochemical cells comprising said electrolyte compositions are provided as well as the use of silyl ester phosphinates in electrolyte compositions. Such electrochemical cells exhibit good capacity retention, good long-term performance, decreased cell resistance and reduced gas generation.

In the following the invention is described in detail.

The non-aqueous electrolyte composition according to the present invention contains
(i) at least one aprotic organic solvent;
(ii) a silyl ester phosphinate;
(iii) at least one lithium ion containing conducting salt; and
(iv) optionally one or more additives.

Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The non-aqueous electrolyte composition contains a silyl ester phosphinate. The term "silyl ester phosphinate" as used herein means that the silyl ester phosphinate is an ester of phosphinic acid

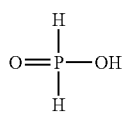

and a Si-containing moiety, wherein one of the two hydrogen atoms connected directly to the phosphorous atom of the phosphinic acid may be replaced by F or an organic substituent to form an P—C bond. The silyl ester bond is formed via the oxygen atom of hydroxy group of the phosphinic acid which is directly connected with the silicon atom of the Si-containing moiety.

The silyl ester phosphinate may be a compound of formula (I)

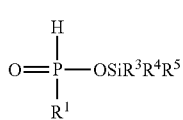

(I)

wherein $R^1$ is selected from H, F, and $R^2$;

$R^2$ is selected from $C_1$-$C_{10}$ alkyl, $C_2$-$C_{10}$ alkenyl, $C_3$-$C_6$ (hetero)cycloalkyl, $C_2$-$C_{10}$ alkynyl, $C_5$-$C_7$ (hetero)aryl, and $C_6$-$C_{13}$ (hetero)aralkyl which may be substituted by one or more substituents selected from $OSi(C_1$-$C_{10}$ alkyl$)_3$, F, CN, $PR^{2e}(O)OSiR^{2a}R^{2b}R^{2c}$, $S(O)_2R^{2d}$, and $OR^{2d}$;

$R^{2a}$, $R^{2b}$, and $R^{2c}$ are independently from each other selected from H, F, Red, and $OR^{2d}$;

$R^{2d}$ is selected independently at each occurrence from $C_1$-$C_{10}$ alkyl, $C_2$-$C_{10}$ alkenyl, $C_3$-$C_6$ (hetero)cycloalkyl, $C_2$-$C_{10}$ alkynyl, $C_5$-$C_7$ (hetero)aryl, and $C_6$-$C_{13}$ (hetero)aralkyl which may be substituted by one or more substituents selected from F and CN;

$R^{2e}$ is selected independently at each occurrence from H, $C_1$-$C_{10}$ alkyl, $C_2$-$C_{10}$ alkenyl, $C_3$-$C_6$ (hetero)cycloalkyl, $C_2$-$C_{10}$ alkynyl, $C_5$-$C_7$ (hetero)aryl, and $C_6$-$C_{13}$ (hetero)aralkyl which may be substituted by one or more substituents selected from F and CN;

$R^3$, $R^4$, and $R^5$ are independently from each other selected from H, F, $R^2$, $OR^2$, $OSi(R^6)_3$, and $OPR^{2e}(O)R^6$; and $R^6$ is independently at each occurrence selected from H, F, $R^2$ and $OR^2$.

The term "$C_1$-$C_{10}$ alkyl" as used herein means a straight or branched saturated hydrocarbon group with 1 to 10 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, 2-ethyl hexyl, n-heptyl, iso-heptyl, n-octyl, iso-octyl, n-nonyl, n-decyl, and the like. Preferred are $C_1$-$C_6$ alkyl, more preferred are $C_1$-$C_4$ alkyl, even more preferred are methyl, ethyl, and n- and isopropyl and most preferred are methyl and ethyl.

The term "$C_3$-$C_6$ (hetero)cycloalkyl" as used herein means a saturated 3- to 6-membered hydrocarbon cycle having one free valence wherein one or more of the C-atoms of the saturated cycle may be replaced independently from each other by a heteroatom selected from N, S, O and P. Examples of $C_3$-$C_6$ cycloalkyl include cyclopropyl, cyclobutyl, cyclopentyl and cyclohexyl, preferred is cyclohexyl. Examples of $C_3$-$C_6$ hetero cycloalkyl are oxiranyl, tetrahydrofuryl, pyrrolidyl, piperidyl and morpholinyl.

The term "$C_2$-$C_{10}$ alkenyl" as used herein refers to an unsaturated straight or branched hydrocarbon group with 2 to 10 carbon atoms having one free valence. Unsaturated means that the alkenyl group contains at least one C—C double bond. $C_2$-$C_{10}$ alkenyl includes for example ethenyl, propenyl, 1-n-butenyl, 2-n-butenyl, iso-butenyl, 1-pentenyl, 1-hexenyl, 1-heptenyl, 1-octenyl, 1-nonenyl, 1-decenyl, and the like. Preferred are $C_2$ to $C_6$ alkenyl groups, even more preferred are $C_2$-$C_4$ alkenyl groups, more preferred are ethenyl and propenyl, most preferred is 1-propen-3-yl, also called allyl.

The term "$C_2$-$C_{10}$ alkynyl" as used herein refers to an unsaturated straight or branched hydrocarbon group with 2 to 10 carbon atoms having one free valence, wherein the hydrocarbon group contains at least one C—C triple bond. $C_2$-$C_{10}$ alkynyl includes for example ethynyl, propynyl, 1-n-butynyl, 2-n-butynyl, iso-butynyl, 1-pentynyl, 1-hexynyl, 1-heptynyl, 1-octynyl, 1-nonynyl, 1-decynyl, and the like. Preferred are $C_2$ to $C_6$ alkynyl, even more preferred are $C_2$-$C_4$ alkynyl, most preferred are ethynyl and 1-propyn-3-yl (propargyl).

The term "$C_5$-$C_7$ (hetero)aryl" as used herein denotes an aromatic 5- to 7-membered hydrocarbon cycle or condensed cycles having one free valence wherein one or more of the C-atoms of the aromatic cycle(s) may be replaced independently from each other by a heteroatom selected from N, S, O and P. Examples of $C_5$-$C_7$ (hetero)aryl are pyrrolyl, furanyl, thiophenyl, pyridinyl, pyranyl, thiopyranyl, and phenyl. Preferred is phenyl.

The term "$C_6$-$C_{13}$ (hetero)aralkyl" as used herein denotes an aromatic 5- to 7-membered hydrocarbon cycle substituted by one or more $C_1$-$C_6$ alkyl wherein one or more of the C-atoms of the aromatic cycle may be replaced independently from each other by a heteroatom selected from N, S, O and P. The $C_6$-$C_{13}$ (hetero)aralkyl group contains in total 6 to 13 C- and heteroatoms and has one free valence. The free valence may be located in the aromatic cycle or in a $C_1$-$C_6$ alkyl group, i.e. $C_6$-$C_{13}$ (hetero)aralkyl group may be bound via the (hetero)aromatic part or via the alkyl part of the group. Examples of $C_6$-$C_{13}$ (hetero)aralkyl are methylphenyl, 2-methylpyridyl, 1,2-dimethylphenyl, 1,3-dimethylphenyl, 1,4-dimethylphenyl, ethylphenyl, 2-propylphenyl, benzyl, 2-$CH_2$-pyridyl, and the like.

The term "may be substituted by" as used herein includes "is substituted by" and "is unsubstituted".

The silyl ester phosphinate of formula (I) may occur in its tautomeric form of a silyl ester phosphonite, e.g. the silyl ester phosphinate $R^1PH(O)(OSiR^3R^4R^5)$ may occur as its tautomer silyl ester phosphonite $R^1P(OH)(OSiR^3R^4R^5)$.

$R^1$ is selected from H, F, and $R^2$.

$R^2$ is selected from $C_1$-$C_{10}$ alkyl, $C_2$-$C_{10}$ alkenyl, $C_3$-$C_6$ (hetero)cycloalkyl, $C_2$-$C_{10}$ alkynyl, $C_5$-$C_7$ (hetero)aryl, and $C_6$-$C_{13}$ (hetero)aralkyl which may be substituted by one or more substituents selected from $OSi(C_1$-$C_{10}$ alkyl$)_3$, F, CN, $PR^{2e}(O)OSiR^{2a}R^{2b}R^{2c}$, $S(O)_2R^{2d}$, and $OR^{2d}$. $R^2$ is preferably selected from $C_1$-$C_6$ alkyl, $C_2$-$C_6$ alkenyl, $C_3$-$C_6$ (hetero)cycloalkyl, $C_2$-$C_6$ alkynyl, $C_5$-$C_7$ (hetero)aryl, and $C_6$-$C_{13}$ (hetero)aralkyl, which may be substituted by one or more substituents selected from $OSi(C_1$-$C_6$ alkyl$)_3$, F, CN, $PR^{2e}(O)OSiR^{2a}R^{2b}R^{2c}$, $S(O)_2R^{2d}$, and $OR^{2d}$, even more preferred $R^2$ is selected form $C_1$-$C_6$ alkyl, $C_3$-$C_6$ (hetero)cycloalkyl, $C_5$-$C_7$ (hetero)aryl, and $C_6$-$C_{13}$ (hetero)aralkyl, which may be substituted by one or more substituents selected from $OSi(C_1$-$C_6$ alkyl$)_3$, F, CN, $PR^{2e}(O)OSiR^{2a}R^{2b}R^{2c}$, $S(O)_2R^{2d}$, and $OR^{2d}$.

$R^{2a}$, $R^{2b}$, and $R^{2c}$ are independently from each other selected from H, F, $R^{2d}$, and $OR^{2d}$, preferably from $R^{2d}$ and $OR^{2d}$.

$R^{2d}$ is selected independently at each occurrence from $C_1$-$C_6$ alkyl, $C_2$-$C_6$ alkenyl, $C_3$-$C_6$ (hetero)cycloalkyl, $C_2$-$C_6$ alkynyl, $C_5$-$C_7$ (hetero)aryl, and $C_6$-$C_{13}$ (hetero)aralkyl which may be substituted by one or more substituents selected from F and CN, preferably $R^{2d}$ is selected independently at each occurrence from $C_1$-$C_6$ alkyl, $C_2$-$C_6$ alkenyl, and $C_2$-$C_6$ alkynyl, which may be substituted by one or more substituents selected from F and CN, more preferred $R^{2d}$ is selected independently at each occurrence from $C_1$-$C_6$ alkyl which may be substituted by one or more substituents selected from F and CN.

$R^{2e}$ is selected independently at each occurrence from H, $C_1$-$C_{10}$ alkyl, $C_2$-$C_{10}$ alkenyl, $C_3$-$C_6$ (hetero)cycloalkyl, $C_2$-$C_{10}$ alkynyl, $C_5$-$C_7$ (hetero)aryl, and $C_6$-$C_{13}$ (hetero)aralkyl which may be substituted by one or more substituents selected from F and CN, preferably $R^{2e}$ is selected independently at each occurrence from H and $C_1$-$C_{10}$ alkyl, more preferred $R^{2e}$ is selected from $C_1$-$C_6$ alkyl, even more preferred $R^{2e}$ is H.

According to one embodiment $R^1$ is selected from H, F, and $R^2$; wherein $R^2$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$, and F.

According to another embodiment $R^1$ is selected from $R^2$; wherein $R^2$ is selected from $C_1$-$C_{10}$ alkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl, which are substituted by one or more substituents selected from CN, $OSi(C_2$-$C_6$ alkyl$)_3$, $PR^{2e}(O)OSiR^{2a}R^{2b}R^{2c}$, $S(O)_2R^{2d}$, and $OR^{2d}$.

According to a further embodiment $R^1$ is selected from $R^2$, wherein $R^2$ is selected from $C_7$-$C_{10}$ alkyl, $C_7$-$C_{10}$ alkenyl, $C_7$-$C_{10}$ alkynyl, and $C_3$-$C_6$ (hetero)cycloalkyl, which may be substituted by one or more substituents selected from $OSi(C_1$-$C_6$ alkyl$)_3$, F, CN, $PR^{2e}(O)OSiR^{2a}R^{2b}R^{2c}$, $S(O)_2R^{2d}$, and $OR^{2d}$.

Preferably $R^1$ is selected from $C_1$-$C_{10}$ alkyl, $C_3$-$C_6$ (hetero)cycloalkyl, and $C_5$-$C_7$ (hetero) which may be substituted by one or more substituents selected from $OSi(C_1$-$C_{10}$ alkyl$)_3$, F, CN, $PR^{2e}(O)OSiR^{2a}R^{2b}R^{2c}$, $S(O)_2R^{2d}$, and $OR^{2d}$, wherein $R^{2a}$, $R^{2b}$, and $R^{2c}$ are independently from each other selected from H, F, $R^{2d}$, and $OR^{2d}$; $R^{2d}$ is selected independently at each occurrence from $C_1$-$C_{10}$ alkyl, which may be substituted by one or more substituents selected from F and CN; and $R^{2e}$ is selected independently at each occurrence from H and $C_1$-$C_{10}$ alkyl, which may be substituted by one or more substituents selected from F and CN.

More preferred $R^1$ is selected from $C_1$-$C_6$ alkyl, $C_3$-$C_6$ (hetero)cycloalkyl, and $C_5$-$C_7$ (hetero)aryl, which may be substituted by one or more substituents selected from $OSi(C_1$-$C_6$ alkyl$)_3$, F, CN, $PR^{2e}(O)OSiR^{2a}R^{2b}R^{2c}$, $S(O)_2R^{2d}$, and $OR^{2d}$, wherein $R^{2a}$, $R^{2b}$, $R^{2c}$ and $R^{2d}$ are each independently are selected from $C_1$-$C_{10}$ alkyl, which may be substituted by one or more substituents selected from F and CN and $R^{2e}$ is selected from H and $C_1$-$C_{10}$ alkyl, which may be substituted by one or more substituents selected from F and CN. Even more preferred $R^1$ is selected from $C_1$-$C_6$ alkyl, $C_3$-$C_6$ (hetero)cycloalkyl, and $C_5$-$C_7$ (hetero)aryl, which may be substituted by one or more from $OSi(C_1$-$C_4$ alkyl$)_3$, F, CN, $PR^{2e}(O)OSiR^{2a}R^{2b}R^{2c}$, $S(O)_2R^{2d}$, and $OR^{2d}$, wherein $R^{2a}$, $R^{2b}$, $R^{2c}$ and $R^{2d}$ are each independently are selected from $C_1$-$C_6$ alkyl, which may be substituted by one or more substituents selected from F and CN, and $R^{2e}$ is selected from H and $C_1$-$C_6$ alkyl, which may be substituted by one or more substituents selected from F and CN. In particular preferred $R^1$ is $C_1$-$C_6$ alkyl, which may be substituted by one or more substituents selected from $OSi(C_1$-$C_4$ alkyl$)_3$, F, CN, $PH(O)OSi(C_1$-$C_4$ alkyl$)_3$, $S(O)_2C_1$-$C_6$ alkyl, and $OC_1$-$C_6$ alkyl wherein each alkyl may be substituted by one or more F and/or CN.

Examples of $R^1$ are H, methyl, $CF_3$, ethyl, $CH_2CH_2F$, $CH_2CF_3$, $CF_2CF_3$, $CH_2CH_2CN$, $CH_2CH_2S(O)_2CH_3$, $CH_2CH_2OCH_3$, $CH_2CH_2OCH_2CH_3$, $CH_2CH_2PH(O)OSi$ $(CH_3)_3$, n-propyl, n-butyl, n-pentyl, n-hexyl, $(CH_2)_6PH(O)$ $OSi(CH_3)_3$, cyclohexyl, and phenyl.

$R^3$, $R^4$, and $R^5$ are independently from each other selected from H, F, $R^2$, $OR^2$, $OSi(R^6)_3$, and $OPR^{2e}(O)R^6$; preferably $R^3$, $R^4$, and $R^5$ are independently from each other selected from $R^2$, $OR^2$, $OSi(R^6)_3$, and $OPR^{2e}(O)R^6$.

$R^6$ is independently at each occurrence selected from H, F, $R^2$ and $OR^2$, preferably $R^6$ is selected from $R^2$ and $OR^2$, more preferred $R^6$ is selected from $C_1$-$C_{10}$ alkyl and $OC_1$-$C_{10}$ alkyl, which may be substituted by one or more F and/or CN, even more preferred $R^6$ is selected from $C_1$-$C_6$ alkyl and $OC_1$-$C_6$ alkyl, which may be substituted by one or more F and/or CN, e.g. $R^6$ is $CH_3$ or $OCH_3$.

Preferably $R^3$, $R^4$, and $R^5$ are independently from each other selected from H, F, $C_1$-$C_{10}$ alkyl, $OC_1$-$C_{10}$ alkyl, $OSi(R^6)_3$, and $OPR^{2e}(O)R^6$;

$R^{2e}$ is selected from H and $C_1$-$C_{10}$ alkyl; and $R^6$ is independently at each occurrence selected from H, F, $C_1$-$C_{10}$ alkyl and $OC_1$-$C_{10}$ alkyl; wherein each $C_1$-$C_{10}$ alkyl individually at each occurrence may be substituted by one or more F and/or CN.

More preferred $R^3$, $R^4$, and $R^5$ are independently from each other selected from H, F, $C_1$-$C_6$ alkyl, $OC_1$-$C_6$ alkyl, $OSi(R^6)_3$, and $OPR^{2e}(O)R^6$;

$R^{2e}$ is selected from H and $C_1$-$C_6$ alkyl; and $R^6$ is independently at each occurrence selected from H, F, $C_1$-$6_0$ alkyl and $OC_1$-$C_6$ alkyl; wherein each $C_1$-$C_{10}$ alkyl individually at each occurrence may be substituted by one or more F and/or CN.

According to one embodiment $R^3$, $R^4$, and $R^5$ are independently from each other selected from H, F, $C_1$-$C_{10}$ alkyl, $OC_1$-$C_{10}$ alkyl, $OSi(C_1$-$C_{10}$ alkyl$)_3$, $OSi(OC_1$-$C_{10}$ alkyl$)_3$, and $OPR^{2e}(O)C_1$-$C_{10}$ alkyl, wherein each $C_1$-$C_{10}$ alkyl individually at each occurrence may be substituted by one or more F and/or CN and $R^{2e}$ is selected from H and $C_1$-$C_{10}$ alkyl; in particular preferred $R^3$, $R^4$, and $R^5$ are independently from each other selected from $C_1$-$C_6$ alkyl, $OC_1$-$C_6$ alkyl, and $OPH(O)C_1$-$C_6$ alkyl, wherein each $C_1$-$C_6$ alkyl individually at each occurrence may be substituted by one or more F and/or CN, e.g. $R^3$, $R^4$, and $R^5$ are each $CH_3$ or $R^3$ and $R^4$ are $CH_3$ and $R^5$ is $OPH(O)CH_3$. Within this embodiment it is preferred that $R^3$, $R^4$, and $R^5$ are selected independently from $C_1$-$C_4$ alkyl and $OPH(O)C_1$-$C_4$ alkyl.

Examples of silyl ester phosphinates are

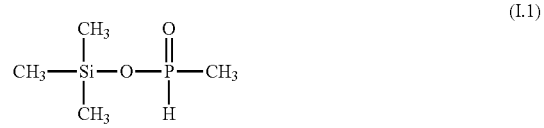

(I.1)

(I.2)

(I.3)

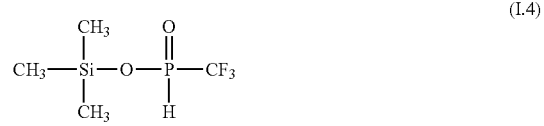

(I.4)

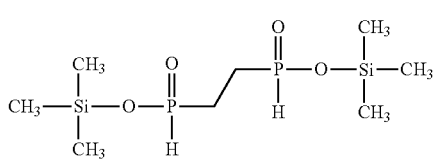
(I.5)

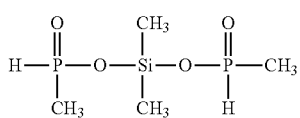
(I.6)

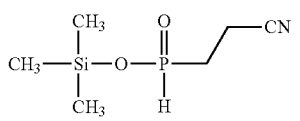
(I.7)

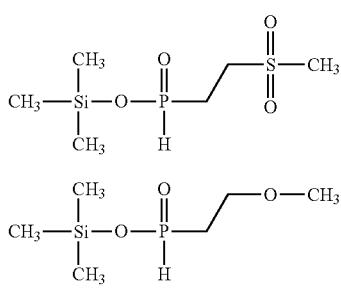
(I.8)

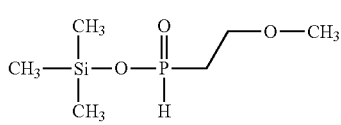
(I.9)

The preparation of the silyl ester phosphinates is known to the person skilled in the art. Descriptions of their preparation are given in the experimental section.

The electrolyte composition may contain one, two, three or more silyl ester phosphinates.

Usually the electrolyte composition contains in total at least 0.001 wt.-% of one or more silyl phosphinate esters, based on the total weight of electrolyte composition, preferably at least 0.01 wt.-%, and more preferred at least 0.1 wt.-%, based on the total weight of electrolyte composition. The maximum value of the total concentration of silyl ester phosphinates in the electrolyte composition is usually 10 wt.-%, based on the total weight of electrolyte composition, preferably 5 wt.-%, more preferred the upper limit of the total concentration of silyl ester phosphinates is 3 wt.-%, based on the total weight of electrolyte composition. Usually the electrolyte composition contains in total 0.001 to 10 wt.-%, of the at least one compound of formula (I), based on the total weight of electrolyte composition, preferably 0.01 to 5 wt.-%, more preferably 0.1 to 5 wt.-% and most preferred 0.1 to 3 wt.-%.

Another aspect of the present invention is the use of a silyl ester phosphinate as additives in electrochemical cells, e.g. in lithium ion capacitors, double layer capacitors and lithium batteries, in particular in secondary lithium batteries as described below. Preferably the silyl ester phosphinates are used in the electrolyte compositions for electrochemical cells. The silyl ester phosphinates are capable of interacting with the cathode at the cathode-electrolyte interface and with the anode at the anode-electrolyte interface thereby reducing undesired reactions of the electrode active material with the electrolyte composition, e.g. inhibiting direct contact of components of the electrolyte composition with the cathode or anode active material by forming a film on the cathode or anode or by inhibiting the formation of electrolyte decomposition products detrimental for the cell operation (e.g. HF). The direct contact of electrolyte composition with the cathode or the anode often leads to decomposition reactions. The silyl ester phosphinates can be used as cathode active additive and as anode active additive.

The silyl ester phosphinates can also be used as additives for reducing gas generation in electrolyte compositions for electrochemical cells and for reducing the impedance built-up in the electrochemical cells, e.g. in lithium ion capacitors, double layer capacitors and lithium batteries, in particular in secondary lithium batteries as described below. Undesired generation of gas within an electrochemical cell is a safety issue since the increase of the internal pressure may lead to leakage of the cell and loss of electrolyte composition increasing the possibility of ignition and emission of unhealthy compounds. Increased impedance leads to undesired degradation of the rate capabilities of the cell.

If the silyl ester phosphinates are used as additives in the electrolyte compositions, they are usually used by adding in the desired amount to the electrolyte composition. They are usually used in the electrolyte composition in the concentrations described above and as described as preferred.

The electrolyte composition contains at least one lithium ion containing conducting salt (iii). The electrolyte composition functions as a medium that transfers ions participating in the electrochemical reaction taking place in an electrochemical cell. The lithium ion containing conducting salt(s) (iii) present in the electrolyte composition are usually solvated in the aprotic organic solvent(s) (i).

The at least one lithium ion containing conducting salt (iii) may be selected from (a) salts of general formula $$Li^+[X]^-$$

wherein X is selected from $Y^1(R^7)_4$ and $Y^2(R^8)_6$;

$Y^1$ is B or Al;

$Y^2$ is P, Sb or As;

$R^7$ and $R^8$ are independently at each occurrence selected from F, $R^9$ and $OR^9$;

$R^9$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more F;

wherein one or two pairs of $R^7$ or one, two, or three pairs of $R^8$ may be combined and jointly be

forming a cycle with $Y^1$ or $Y^2$, respectively;

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid;

(b) salts of general formula $$Li[Z(C_nF_{2n+1}SO_2)_m],$$

wherein m is 1 when Z is selected from oxygen and sulfur, m is 2 when Z is selected from nitrogen and phosphorus, m is 3 when Z is selected from carbon and silicon, and n is an integer in the range from 1 to 20;

and (c) salts selected from the group consisting of LiClO$_4$; LiCF$_3$SO$_3$; Li$_2$SiF$_6$; LiAlO$_4$, Li(N(SO$_2$F)$_2$), and lithium oxalate.

The lithium ion conducting salt (iii) may be selected from salts of formula Li$^+$[X]$^-$
wherein X is selected from Y$^1$(R$^7$)$_4$ and Y$^2$(R$^8$)$_6$;
Y$^1$ is B or Al;
Y$^2$ is P, Sb or As;
R$^7$ and R$^8$ are independently at each occurrence selected from F, R$^9$ and OR$^9$;
R$^9$ is selected from C$_1$-C$_6$ alkyl, C$_2$-C$_6$ alkenyl, C$_2$-C$_6$ alkynyl, C$_5$-C$_7$ (hetero)aryl, and C$_6$-C$_{13}$ (hetero)aralkyl which may be substituted by one or more F;
wherein one or two pairs of R$^7$ or one, two, or three pairs of R$^8$ may be combined and jointly be

forming a cycle with Y$^1$ or Y$^2$, respectively;

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid;

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid. The bidentate radical is derived by abstracting two hydrogens from the two OH- groups present in the diol, hydroxycarboxylic acid or the dicarboxylic acid. Examples of suited diols, hydroxycarboxylic acids and dicarboxylic acids from which

may be derived are 1,2-dihydroxy benzene, salicylic acid, oxalic acid, malonic acid, maleic acid, and succinic acid. Abstracting two hydrogens from the two OH-groups in 1,2-, 1,3- or 1,4 from these molecules results in bidentate radicals which are called catecholato, salicylato, oxalato, malonato, maleato and succinato, respectively. Preferably

is derived from a 1,2-, 1,3- or 1,4-dicarboxylic acid, more preferred

is derived from oxalic acid, malonic acid, maleic acid, and succinic acid, in particular preferred from oxalic acid.

According to one embodiment of the invention X contains at least one

group derived from a 1,2-, 1,3- or 1,4-diol, from a 1,2- or 1,3- or 1,4-dicarboxylic acid or from a 1,2-, 1,3- or 1,4-hydroxycarboxylic acid, preferably X contains at least one

group derived from oxalic acid, maleic acid, malonic acid, or succinic acid, more preferred X contains at least one

group derived from oxalic acid. This embodiment is specially preferred if X is B or P, in particular if X is B and the third R$^7$ and fourth R$^7$ are F.

X is selected from Y$^1$(R$^7$)$_4$ and Y$^2$(R$^8$)$_6$.
Y$^1$ is B or Al, preferably B, and Y$^2$ is P, Sb or As, preferably P.
X may be Al(R$^7$)$_4$, B(R$^7$)$_4$, Sb(R$^8$)$_6$, As(R$^8$)$_6$ or P(R$^8$)$_6$. Preferably X is B(R$^7$)$_4$ or P(R$^8$)$_6$.
X' may be Al(R$^7$)$_{4-b}$, B(R$^7$)$_{4-b}$, Sb(R$^8$)$_{6-b}$, As(R$^8$)$_{6-b}$ or P(R$^8$)$_{6-b}$, wherein b is 1. Preferably X' is B(R$^7$)$_{4-b}$ or P(R$^8$)$_{6-b}$, wherein b is 1.
R$^7$ and R$^8$ are independently at each occurrence selected from F, R$^9$ and OR$^9$, wherein one or two pairs of R$^7$ or one, two or three pairs of R$^8$ may be combined and jointly be

forming a cycle with Y$^1$ or Y$^2$, respectively. "independently at each occurrence" means, that each R$^7$ of a Y$^1$(R$^7$)$_{4-b}$ group may be same or different from other R$^7$ present in the Y$^1$(R$^7$)$^{4-b}$ group and each R$^8$ of a Y$^2$(R$^8$)$_{6-b}$ group may be same or different from other R$^8$ being present in a Y$^2$(R$^8$)$_{6-b}$ group.

R$^9$ is selected from C$_1$-C$_6$ alkyl, C$_2$-C$_6$ alkenyl, C$_2$-C$_6$ alkynyl, C$_5$-C$_7$ (hetero)aryl, and C$_6$-C$_{13}$ (hetero)aralkyl which may be substituted by one or more F, preferably R$^9$ is selected from C$_1$-C$_6$ alkyl, which may be substituted by one or more F, more preferred R$^9$ is selected from C$_1$-C$_6$ alkyl, which is substituted by one or more F.

In case of X=Y$^1$(R$^7$)$_4$ four R$^7$ are present, which are selected independently from each other from F, R$^9$ and OR$^9$. Preferably R$^7$ is independently selected from F and OR$^9$, more preferred from F and OR$^9$ wherein R$^9$ is C$_1$-C$_6$ alkyl, which may be substituted by one or more F, even more preferred R$^7$ is selected from F and OR$^9$ wherein R$^9$ is C$_1$-C$_6$ alkyl, which is substituted by one or more F. One or two pairs of R$^7$ may be combined and jointly be

forming a cycle with Y$^1$, in case four R$^7$ are present one or two pairs of R$^7$ may be combined and jointly be

forming a cycle with Y$^1$.

In case of X=Y$^2$(R$^8$)$_6$ six R$^8$ are present, which are selected independently from each other from F, R$^9$ and OR$^9$. Preferably R$^8$ is independently selected from F and R$^9$, more preferred from F and C$_1$-C$_6$ alkyl, which may be substituted by one or more F, even more preferred R$^8$ is selected from F and C$_1$-C$_6$ alkyl, which is substituted by one or more F. One, two or three pairs of R$^8$ may be combined and jointly be

forming a cycle with Y$^2$.

A pair of R denotes two R, e.g. a pair of R$^7$ means two of R$^7$, two pairs of R$^8$ mean two times two R$^8$ and three pairs of R$^8$ mean three times of R$^8$.

According to one embodiment R$^7$ and R$^8$ are independently at each occurrence selected from F, OC$_1$-C$_6$ alkyl, and C$_1$-C$_6$ alkyl which may be substituted by at least one F and wherein one or two pairs of R$^7$ or one, two or three pairs of R$^8$ may be combined and jointly be

forming a cycle with Y$^1$ or Y$^2$, respectively, preferably R$^7$ and R$^8$ are independently at each occurrence selected from F, OC$_1$-C$_6$ alkyl, and C$_1$-C$_6$ alkyl substituted by at least one F wherein one or two pairs of R$^7$ or one, two or three pairs of R$^8$ may be combined and jointly be

forming a cycle with Y$^1$ or Y$^2$, respectively. More preferred R$^7$ and R$^8$ are F wherein one pair of R$^7$ or one or two pairs of R$^8$ may be combined and jointly be

forming a cycle with Y$^1$ or Y$^2$, respectively.

According to one embodiment at least one of R$^7$ is F. Such salts may be expressed by the formula Li$^+$[X'—F]$^-$ wherein X' is Y$^1$(R$^7$)$_{4-b}$ with b=1.

According to another embodiment at least one R$^8$ is F. Such salts may be expressed by the formula Li$^+$[X'—F]$^-$ wherein X' is Y$^2$(R$^8$)$_{6-b}$ with b=1.

Examples of lithium ion conducting salts of formula Li$^+$[X]$^-$ are LiAlF$_4$, LiBF$_4$, lithium difluoro oxalato borate, lithium (bisoxalato) borate, LiPF$_6$, LiPF$_3$(C$_2$F$_5$)$_3$, lithium difluoro (bisoxalato) phosphate, lithium tetrafluoro (oxalato) phosphate, lithium (trisoxalato) phosphate, LiSbF$_6$, and LiAsF$_6$. Examples of lithium ion conducting salts of formula Li$^+$[X'—F]$^-$ are LiAlF$_4$, LiBF$_4$, lithium difluoro oxalato borate, LiPF$_6$, LiPF$_3$(C$_2$F$_5$)$_3$, lithium difluoro (bisoxalato) phosphate, lithium tetrafluoro (oxalato) phosphate, LiSbF$_6$, and LiAsF$_6$.

The at least one lithium conducting salt (iii) preferably contains at least one F, preferred examples of F containing lithium conducting salts are LiAlF$_4$, LiBF$_4$, lithium difluoro oxalato borate, LiPF$_6$, LiPF$_3$(C$_2$F$_5$)$_3$, lithium difluoro (bisoxalato) phosphate, lithium tetrafluoro (oxalato) phosphate, LiSbF$_6$, LiAsF$_6$, Li(N(SO$_2$F)$_2$), Li(N(SO$_2$CF$_3$)$_2$), and LiCF$_3$SO$_3$.

Preferably the at least one lithium ion containing conducting salt (iii) is selected from LiPF$_6$, LiAsF$_6$, LiCF$_3$SO$_3$, LiBF$_4$, lithium difluoro oxalato borate, lithium bis(oxalato) borate, LiClO$_4$, LiN(SO$_2$C$_2$F$_5$)$_2$, LiN(SO$_2$CF$_3$)$_2$, and LiN(SO$_2$F)$_2$, and, more preferred the conducting salt is selected from LiPF$_6$, LiN(SO$_2$F)$_2$, and LiBF$_4$, and the most preferred conducting salt is LiPF$_6$. The electrolyte composition may contain one, two or more lithium conducting salts, e.g. the electrolyte composition may contain both LiBF$_4$ and LiPF$_6$.

The lithium conducting salt(s) are usually present at a minimum concentration of at least 0.1 mol/l, preferably the concentration of the ion containing conducting salt(s) is 0.5 to 2 mol/l based on the entire electrolyte composition.

The electrolyte composition contains at least one aprotic organic solvent (i). The at least one aprotic organic solvent may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from selected from fluorinated and non-fluorinated cyclic and acyclic organic carbonates, fluorinated and non-fluorinated ethers and polyethers, fluorinated and non-fluorinated cyclic ethers, fluorinated and non-fluorinated cyclic and acyclic acetales and ketales, fluorinated and non-fluorinated orthocarboxylic acids esters, fluorinated and non-fluorinated cyclic and acyclic esters and diesters of carboxylic acids, fluorinated and non-fluorinated cyclic and acyclic sulfones, fluorinated and non-fluorinated cyclic and acyclic nitriles and dinitriles, fluorinated and non-fluorinated cyclic and acyclic phosphates, and mixtures thereof.

Examples of fluorinated and non-fluorinated cyclic carbonates are ethylene carbonate (EC), propylene carbonate (PC) and butylene carbonate (BC), wherein one or more H may be substituted by F and/or an C$_1$ to C$_4$ alkyl group, e.g. 4-methyl ethylene carbonate, monofluoroethylene carbonate (FEC), and cis- and trans-difluoroethylene carbonate. Preferred fluorinated and non-fluorinated cyclic carbonates are ethylene carbonate, monofluoroethylene carbonate, and propylene carbonate, in particular ethylene carbonate.

Examples of fluorinated and non-fluorinated acyclic carbonates are di-$C_1$-$C_{10}$-alkylcarbonates, wherein each alkyl group is selected independently from each other and wherein one or more H may be substituted by F. Preferred are fluorinated and non-fluorinated di-$C_1$-$C_4$-alkylcarbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of fluorinated and non-fluorinated acyclic organic carbonates and cyclic organic carbonates at a ratio by weight of from 1:10 to 10:1, preferred of from 3:1 to 1:1.

Examples of fluorinated and non-fluorinated acyclic ethers and polyethers are fluorinated and non-fluorinated di-$C_1$-$C_{10}$-alkylethers, fluorinated and non-fluorinated di-$C_1$-$C_4$-alkyl-$C_2$-$C_6$-alkylene ethers, fluorinated and non-fluorinated polyethers, and fluorinated ethers of formula R'—(O—$CF_pH_{2-p}$)$_q$—R'' wherein R' is a $C_1$-$C_{10}$ alkyl group or a $C_3$-$C_{10}$ cycloalkyl group, wherein one or more H of an alkyl and/or cycloalkyl group are substituted by F; R'' is H, F, a $C_1$-$C_{10}$ alkyl group, or a $C_3$-$C_{10}$ cycloalkyl group, wherein one or more H of an alkyl and/or cycloalkyl group are substituted by F; p is 1 or 2; and q is 1, 2 or 3.

According to the invention each alkyl group of the fluorinated and non-fluorinated di-$C_1$-$C_{10}$-alkylethers is selected independently from the other wherein one or more H of an alkyl group may be substituted by F. Examples of fluorinated and non-fluorinated di-$C_1$-$C_{10}$-alkylethers are dimethylether, ethylmethylether, diethylether, methylpropylether, diisopropylether, di-n-butylether, 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of fluorinated and non-fluorinated di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether, wherein one or more H may be replaced by F.

Examples of suitable fluorinated and non-fluorinated polyethers are polyalkylene glycols wherein one or more H of an alkyl or alkylene group may be substituted by F, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of fluorinated ethers of formula R'—(O—$CF_pH_{2-p}$)$_q$—R'' are 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of fluorinated and non-fluorinated cyclic ethers are 1,4-dioxane, tetrahydrofuran, and their derivatives like 2-methyl tetrahydrofuran wherein one or more H of an alkyl group may be substituted by F.

Examples of fluorinated and non-fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of fluorinated and non-fluorinated acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of fluorinated and non-fluorinated acyclic esters of carboxylic acids are ethyl and methyl formate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of fluorinated and non-fluorinated cyclic and acyclic sulfones are ethyl methyl sulfone, dimethyl sulfone, and tetrahydrothiophene-S,S-dioxide (sulfolane) wherein one or more H may be substituted by F.

Examples of fluorinated and non-fluorinated cyclic and acyclic nitriles and dinitriles are adipodinitrile, acetonitrile, propionitrile, and butyronitrile wherein one or more H may be substituted by F.

Examples of fluorinated and non-fluorinated cyclic and acyclic phosphates are trialkyl phosphates wherein one or more H of an alkyl group may be substituted by F like trimethyl phosphate, triethyl phosphate, and tris(2,2,2-trifluoroethyl)phosphate.

More preferred the aprotic organic solvent(s) are selected from fluorinated and non-fluorinated ethers and polyethers, fluorinated and non-fluorinated cyclic and acyclic organic carbonates, fluorinated and non-fluorinated cyclic and acyclic esters and diesters of carboxylic acids and mixtures thereof. Even more preferred the aprotic organic solvent(s) are selected from fluorinated and non-fluorinated ethers and polyethers, and fluorinated and non-fluorinated cyclic and acyclic organic carbonates, and mixtures thereof.

According to one embodiment the electrolyte composition contains at least solvent selected from fluorinated ethers and polyethers, e.g. compounds of formula fluorinated ethers of formula R'—(O—$CF_pH_{2-p}$)$_q$—R'' as defined above like $CF_2HCF_2CH_2OCF_2CF_2H$ or $CF_2H(CF_2)_3CH_2OCF_2CF_2H$.

According to another embodiment, the electrolyte composition contains at least one solvent selected from fluorinated cyclic carbonate like 1-fluoro ethyl carbonate.

According to a further embodiment the electrolyte composition contains at least one solvent selected from fluorinated cyclic carbonate, e.g. 1-fluoro ethyl carbonate, and at least one solvent selected from fluorinated ethers and polyethers, e.g. compounds of formula fluorinated ethers of formula R'—(O—$CF_rH_{2-r}$)$_s$—R'' as defined above like $CF_2HCF_2CH_2OCF_2CF_2H$ or $CF_2H(CF_2)_3CH_2OCF_2CF_2H$.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

Furthermore, the electrolyte composition may contain at least one further additive different from the silyl ester phosphinates. The at least one further additive different from the silyl ester phosphinates may be selected from polymers, film forming additives, flame retardants, overcharging additives, wetting agents, HF and/or $H_2O$ scavenger, stabilizer for $LiPF_6$ salt, ionic solvation enhancer, corrosion inhibitors, and gelling agents.

The minimum concentration of the at least one further additive is usually 0.005 wt.-%, preferably the minimum concentration is 0.01 wt.-% and more preferred the minimum concentration is 0.1 wt.-%, based on the total weight of electrolyte composition. The maximum concentration of the at least further additive is usually 25 wt.-%.

One class of further additives are polymers. Polymers may be selected from polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. Polymers may be added to a formulation according to the present invention in order to convert liquid formulations into quasi-solid or solid electrolytes and thus to improve solvent retention, especially during ageing. In this case the function as gelling agents.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Another class of additives are film forming additives, also called SEI-forming additives. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; organic sultones such as propylene sultone, propane sultone and their derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

A compound added may have more than one effect in the electrolyte composition and the electrochemical cell comprising the electrolyte composition. E.g. lithium oxalato borate may be added as additive enhancing the SEI formation but can also function as conducting salt.

The electrolyte composition is preferably non-aqueous. In one embodiment of the present invention, the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte composition may be prepared by methods which are known to the person skilled in the field of the production of electrolytes, generally by dissolving the lithium conductive salt(s) (iii) in the corresponding solvent or solvent mixture (i) and adding the silyl ester phosphinate(s) (ii) or a solvent or solvent mixture containing the reaction products of the preparation of the silyl ester phosphinate(s) (ii) and optionally further additive(s) (iv).

Another aspect of the invention are electrochemical cells comprising the electrolyte as described above or as described as preferred.

The electrochemical cell usually comprises (A) an anode comprising at least one anode active material, (B) a cathode comprising at least one cathode active material; and (C) the electrolyte composition as described above.

The electrochemical cell may be a lithium battery, a double layer capacitor, or a lithium ion capacitor. The general construction of such electrochemical devices is known and is familiar to the person skilled in this art—for batteries, for example, in Linden's Handbook of Batteries (ISBN 978-0-07-162421-3).

Preferably the inventive electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds. The lithium battery is preferably a secondary lithium battery, i.e. a rechargeable lithium battery.

In particular preferred embodiments the electrochemical cell is a lithium ion battery, i.e. a secondary lithium ion electrochemical cell comprising a cathode (A) comprising a cathode active material that can reversibly occlude and release lithium ions and an anode (B) comprising an anode active material that can reversibly occlude and release lithium ions.

Anode (A) comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite materials, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon; and carbonic anode active material (thermally decomposed carbon, coke, graphite) such as a carbon composite, combusted organic polymer, and carbon fiber. A preferred carbonaceous material is graphite.

Further examples of anode active materials are lithium metal and lithium metal alloys, i.e. materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Further possible anode active materials are silicon containing materials. Silicon containing materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material comprises carbonaceous material that can reversibly occlude and release lithium ions, particularly preferred the carbonaceous material that can reversibly occlude and release lithium ions is selected from crystalline carbon, hard carbon and amorphous carbon, and particularly preferred is graphite. It is also preferred that the anode active material comprises silicon containing materials. It is further preferred that the anode active material comprises lithium ion intercalating oxides of Ti.

The inventive electrochemical cell comprises a cathode (B) comprising at least one cathode active material. The at least one cathode active material comprises a material capable of occluding and releasing lithium ions and may be selected from lithium transition metal oxides and lithium transition metal phosphates of olivine structure.

Examples of lithium transition metal phosphates of olivine structure are $LiFePO_4$; $LiNiPO_4$; $LiMnPO_4$; and $LiCoPO_4$.

Examples of lithium transition metal oxides are $LiCoO_2$, $LiNiO_2$, $LiMnO_2$, mixed lithium transition metal oxides with layer structure, manganese containing spinels, and lithium intercalating mixed oxides of Ni, Al and at least one second transition metal.

Preferably the at least one cathode active material is selected from mixed lithium transition metal oxides containing Mn and at least one second transition metal; lithium intercalating mixed oxides containing Ni, Al and at least one second transition metal; $LiMnPO_4$; $LiNiPO_4$; and $LiCoPO_4$.

Examples of mixed lithium transition metal oxides containing Mn and at least one second transition metal are lithium transition metal oxides with layered structure of formula (II)

$$Li_{1+e}(Ni_aCo_bMn_cM_d)_{1-e}O_2 \quad (II)$$

wherein a is in the range of from 0.05 to 0.9, preferred in the range of 0.1 to 0.8, b is in the range of from zero to 0.35, c is in the range of from 0.1 to 0.9, preferred in the range of 0.2 to 0.8, d is in the range of from zero to 0.2, e is in the range of from zero to 0.3, preferred in the range of >zero to 0.3, more preferred in the range of 0.05 to 0.3, with a+b+c+d=1, and M being one or more metals selected from Na, K, Al, Mg, Ca, Cr, V, Mo, Ti, Fe, W, Nb, Zr, and Zn.

Cobalt containing compounds of formula (II) are also named NCM.

Lithium transition metal oxides with layered structure of formula (II) wherein e is larger than zero are also called overlithiated.

Preferred lithium transition metal oxides with layered structure of formula (II) are compounds forming a solid solution wherein a LiM'O$_2$ phase in which M' is Ni, and optionally one or more transition metals selected from Co and Mn and a Li$_2$MnO$_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (IIa)

$z$LiM'O$_2$.(1−$z$)Li$_2$MnO$_3$ (IIa)

wherein M' is Ni and at least one metal selected from Mn and Co;

$z$ is 0.1 to 0.8, and wherein one or more metals selected from Na, K, Al, Mg, Ca, Cr, V, Mo, Ti, Fe, W, Nb, Zr, and Zn may be present.

Electrochemically, the Ni and if present Co atoms in the LiM'O$_2$ phase participate in reversible oxidation and reduction reactions leading to Li-ions deintercalation and intercalation, respectively, at voltages below 4.5 V vs. Li$^+$/Li, while the Li$_2$MnO$_3$ phase participates only in oxidation and reduction reactions at voltages equal or above 4.5 V vs. Li$^+$/Li given that Mn in the Li$_2$MnO$_3$ phase is in its +4 oxidation state. Therefore, electrons are not removed from the Mn atoms in this phase but from the 2p orbitals of oxygen ions, leading to the removal of oxygen from the lattice in the form of O$_2$ gas at least in the first charging cycling.

These compounds are also called HE-NCM due to their higher energy densities in comparison to usual NCMs. Both HE-NCM and NCM have operating voltages of about 3.0 to 3.8 V against Li/Li$^+$, but high cut off voltages have to be used both for activating and cycling of HE-NCMs to actually accomplish full charging and to benefit from their higher energy densities. Usually the upper cut-off voltage for the cathode during charging against Li/Li$^+$ is of at least 4.5 V for activating the HE-NCM, preferably of at least 4.6 V, more preferred of at least 4.7 V and even more preferred of at least 4.8 V. The term "upper cut-off voltage against Li/Li$^+$ during charging" of the electrochemical cell means the voltage of the cathode of the electrochemical cell against a Li/Li$^+$ reference anode which constitute the upper limit of the voltage at which the electrochemical cell is charged. Examples of HE-NCMs are 0.33Li$_2$MnO$_3$.0.67Li(Ni$_{0.4}$Co$_{0.2}$Mn$_{0.4}$)O$_2$, 0.42Li$_2$MnO$_3$.0.58Li(Ni$_{0.4}$Co$_{0.2}$Mn$_{0.4}$)O$_2$, 0.50Li$_2$MnO$_3$.0.50Li(Ni$_{0.4}$Co$_{0.2}$Mn$_{0.4}$)O$_2$, 0.40Li$_2$MnO$_3$.0.60Li(Ni$_{0.8}$Co$_{0.1}$Mn$_{0.1}$)O$_2$, and 0.42Li$_2$MnO$_3$.0.58Li(Ni$_{0.6}$Mn$_{0.4}$)O$_2$.

Examples of manganese-containing transition metal oxides with layer structure of formula (II) wherein d is zero are LiNi$_{0.33}$Mn$_{0.67}$O$_2$, LiNi$_{0.25}$Mn$_{0.75}$O$_2$, LiNi$_{0.35}$Co$_{0.15}$Mn$_{0.5}$O$_2$, LiNi$_{0.21}$Co$_{0.08}$Mn$_{0.71}$O$_2$, LiNi$_{0.22}$Co$_{0.12}$Mn$_{0.66}$O$_2$, LiNi$_{0.8}$Co$_{0.1}$Mn$_{0.1}$O$_2$, LiNi$_{0.6}$Co$_{0.2}$Mn$_{0.2}$O$_2$, and LiNi$_{0.5}$Co$_{0.2}$Mn$_{0.3}$O$_2$. It is preferred that the transition metal oxides of general formula (II) wherein d is zero do not contain further cations or anions in significant amounts.

Examples of manganese-containing transition metal oxides with layer structure of formula (II) wherein d is larger than zero are 0.33Li$_2$MnO$_3$.0.67Li(Ni$_{0.4}$Co$_{0.2}$Mn$_{0.4}$)O$_2$, 0.42Li$_2$MnO$_3$.0.58Li(Ni$_{0.4}$Co$_{0.2}$Mn$_{0.4}$)O$_2$, 0.50Li$_2$MnO$_3$.0.50Li(Ni$_{0.4}$Co$_{0.2}$Mn$_{0.4}$)O$_2$, 0.40Li$_2$MnO$_3$.0.60Li(Ni$_{0.8}$Co$_{0.1}$Mn$_{0.1}$)O$_2$, and 0.42Li$_2$Mn$_3$.0.58Li(Ni$_{0.6}$Mn$_{0.4}$)O$_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (II) are Ni-rich compounds, wherein the content of Ni is at least 50 mol. % based on the total amount of transition metal present. This includes compounds of formula (IIb)

Li$_{1+e}$(Ni$_a$Co$_b$Mn$_c$M$_d$)$_{1-e}$O$_2$ (IIb)

wherein a is in the range of from 0.5 to 0.9, preferred in the range of 0.5 to 0.8, b is in the range of from zero to 0.35, c is in the range of from 0.1 to 0.5, preferred in the range of 0.2 to 0.5, d is in the range of from zero to 0.2, e is in the range of from zero to 0.3, with a+b+c+d=1, and M being one or more metals selected from Na, K, Al, Mg, Ca, Cr, V, Mo, Ti, Fe, W, Nb, Zr, and Zn.

Examples of Ni-rich compounds of formula (II) are Li[Ni$_{0.8}$Co$_{0.1}$Mn$_{0.1}$]O$_2$ (NCM 811), Li[Ni$_{0.6}$Co$_{0.2}$Mn$_{0.2}$]O$_2$ (NCM 622), and Li[Ni$_{0.5}$Co$_{0.2}$Mn$_{0.3}$]O$_2$ (NCM 523).

Further examples of mixed lithium transition metal oxides containing Mn and at least one second transition metal are manganese-containing spinels of formula (III)

Li$_{1+t}$M$_{2-t}$O$_{4-s}$ (III)

wherein s is 0 to 0.4, t is 0 to 0.4, and

M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (IV)

Li[Ni$_h$Co$_i$Al$_j$]O$_2$ (IV)

wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode active material may also be selected from LiMnPO$_4$, LiNiPO$_4$ and LiCoPO$_4$. These phosphates show usually olivine structure and usually upper cut-off voltages of at least 4.5 V have to be used for charging.

Cathode (B) may contain further components like binders and electrically conductive materials such as electrically conductive carbon. For example, cathode (B) may comprise carbon in a conductive polymorph, for example selected from graphite, carbon black, carbon nanotubes, graphene or mixtures of at least two of the aforementioned substances. Examples of binders used in cathode (B) are organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinylidene chloride, polyvinyl chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Anode (A) and cathode (B) may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin or Nafion separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive electrochemical cells can also be used for stationary energy stores.

The present invention is further illustrated by the following examples that do not, however, restrict the invention.
Experimental Section:
I. Electrolyte Additives:

The additives were synthesized following standard silylation procedures M1 [use of silylchloride and amine base, according to Woronkow, Sgonnik, Zhurnal Obshchei Khimii, engl. Edit., Vol. 27 (1957), pages 1550 to 1553] or M2 [use of bis(trimethylsilyl)ether (HMDSO), according to N. Weferling, R. Schmutzler, Zeitschrift für Naturforschung, B: Chemical Sciences, Vol. 43 (1988), pages 1524 to 1528] from the respective phosphinic acids (RPH(O)OH). Non-commercial phosphonic acids were prepared by hydrolysis of dichlorophospines according to procedure M3 [according to G. M. Kosolapoff, J. S. Powell, Journal of the American Chemical Society, Vol. 72 (1950), pages 4291 to 4292], AIBN-mediated Hydrophosphinylation M4 or Michael-addition M5 [both according to M. S. Markoulides, A. C. Regan, Tetrahedron Letters, Vol. 52 (2011), pages 2954 to 2956].

TABLE 1

Electrolyte additives employed

A1: TMSO—P(=O)(OTMS)—OTMS

A2: TMSO—P(=O)(H)—CH$_3$

A3: TMSO—P(=O)(H)—cyclohexyl

A4: TMSO—P(=O)(H)—phenyl

A5: TMSO—P(=O)(H)—(branched alkyl chain)

A2 Trimethylsilyl Methylphosphinate (CAS: 99136-11-5)

Following method M1, Me$_3$SiCl (1.5 eq, 236 mmol, 25.8 g) was added at RT to a solution of methylphosphinic acid (1 eq, 157 mmol, 14.0 g; prepared using M3) and trimethylamine (1.5 eq, 236 mmol, 23.8 g) in 350 mL toluene. The formed suspension was further stirred at 50° C. for 3 h until $^{31}$P NMR measurement indicated full conversion. The formed precipitate was filtered off, washed with 200 mL toluene and concentrated in vacuo to obtain a colorless oil, which was further distilled (bp.: 53-54° C., 3.4 mbar) to yield compound A2 (18.4 g, 121 mmol, 77% yield).

$^1$H NMR (500 MHz, CDCl$_3$) δ 7.20 (dq, J=546.4, 2.1 Hz, 1H), 1.45 (dd, J=15.1, 2.0 Hz, 3H), 0.26 (s, 9H). $^{31}$P NMR (203 MHz, CDCl$_3$) δ 21.43.

A3 Trimethylsilyl Cyclohexylphosphinate (CAS: 77339-71-0)

Following method M2, to a suspension of cyclohexylphosphinic acid (1.0 eq, 33 mmol, 5.0 g; prepared using M4) in 25 mL toluene was slowly added HMDS (0.6 eq, 20 mmol, 3.3 g) and the formed gel further stirred at 90° C. for 2 h until $^{31}$P NMR measurement indicated full conversion. The formed precipitate was filtered off, washed with 200 mL toluene and concentrated in vacuo to obtain a colorless oil, which was further distilled (bp.: 120° C. (0.4 mbar) to yield compound A3 (4.4 g, 19 mmol, 58% yield).

$^1$H NMR (500 MHz, CDCl$_3$) δ 6.76 (dd, J=525.9, 1.5 Hz, 1H), 1.90-1.45 (m, 6H), 1.25-1.06 (m, 5H), 0.22 (s, 9H). $^{31}$P NMR (203 MHz, CDCl$_3$) δ 31.79.

A4 Trimethylsilyl Phenylphosphinate (CAS: 27262-80-2)

Following method M1, Me$_3$SiCl (1.0 eq, 150 mmol, 16.5 g) was added at RT to a solution of phenylphosphinic acid (1.0 eq, 150 mmol, 21.3 g; prepared using M3) and trimethylamine (1.05 eq, 158 mmol, 15.9 g) in 350 mL toluene. The formed suspension was further stirred at 50° C. for 3 h until $^{31}$P NMR measurement indicated full conversion. The formed precipitate was filtered off, washed with 200 mL toluene and concentrated in vacuo to obtain a colorless oil, which was further distilled (bp.: 71° C., 0.15 mbar) to yield compound A4 (27.6 g, 129 mmol, 86% yield).

$^1$H NMR (500 MHz, CDCl$_3$) δ 7.71 (ddd, J=14.2, 8.2, 1.4 Hz, 2H), 7.60 (d, J=566.6 Hz, 1H), 7.56-7.50 (m, 1H), 7.46 (ddd, J=8.5, 6.8, 3.5 Hz, 2H), 0.27 (s, 9H). $^{31}$P NMR (203 MHz, CDCl$_3$) δ 13.21.

A5 Trimethylsilyl Hexylphosphinate (CAS: 77339-70-9)

Following method M2, to a suspension of hexylphosphinic acid (1.0 eq, 33 mmol, 5.0 g; prepared using M4) in 25 mL toluene was slowly added HMDS (0.6 eq, 20 mmol, 3.2 g) and the formed gel further stirred at 90° C. for 6 h until $^{31}$P NMR measurement indicated full conversion. The formed precipitate was filtered off, washed with 200 mL toluene and concentrated in vacuo to obtain a colorless oil, which was further distilled (bp.: 110° C. (0.1 mbar) to yield compound A5 (5.4 g, 24 mmol, 73% yield).

$^1$H NMR (500 MHz, CDCl$_3$) δ 7.06 (dt, J=534.2, 1.9 Hz, 1H), 1.66 (dtdd, J=15.2, 7.3, 5.9, 1.9 Hz, 2H), 1.55-1.46 (m, 2H), 1.40-1.30 (m, 2H), 1.25 (pd, J=6.3, 5.4, 3.0 Hz, 4H), 0.84 (t, J=6.9 Hz, 3H), 0.27 (s, 9H). $^{31}$P NMR (203 MHz, CDCl$_3$) δ 27.30.

II. Electrolyte Compositions

The electrolyte compositions containing 1.0 M LiPF$_6$ in a mixture of ethyl carbonate (EC, BASF), diethyl carbonate (DEC, BASF), monofluoroethylene carbonate (FEC, BASF), and vinylene carbonate (VC) were prepared. Different comparative and inventive additives were added to these compositions as indicated in Table 2. "vol. %" refers to the volume of the solvents in the electrolyte composition, "wt. %" refer to the total weight of the electrolyte composition. All solvents were dry (water content <3 ppm). All electrolyte compositions were prepared and stored in an Ar-filled glovebox having oxygen and water levels below 1.0 ppm.

TABLE 2

Electrolyte compositions employed

| Electrolyte composition | Solvents [vol. %] | | | | Additives [wt. %] | | | | |
|---|---|---|---|---|---|---|---|---|---|
| | EC | DEC | FEC | VC | A1 | A3 | A4 | A5 |
| EL 1 (comparative) | 30 | 70 | 1.5 | 1 | — | — | — | — |
| EL 2 (comparative) | 30 | 70 | 1.5 | 1 | 2 | — | — | — |
| EL 3 (inventive) | 30 | 70 | 1.5 | 1 | — | 2 | — | — |
| EL 4 (inventive) | 30 | 70 | 1.5 | 1 | — | — | 2 | — |
| EL 5 (inventive) | 30 | 70 | 1.5 | 1 | — | — | — | 2 |

III. Electrochemical Cells

III.1) NCM622/Graphite Pouch Cells

The positive electrodes for the electrochemical cycling experiments in pouch cells were prepared by coating on aluminum foil (thickness=17 μm) using a roll coater a slurry containing cathode active material, carbon black and polyvinylidene fluoride (PVdF) binders suspended in N-methyl-2-pyrrolidinone (NMP). The electrode tapes were dried in a hot air chamber and dried further under vacuum at 130° C. for 8 h and the electrodes were pressed using a roll pressor. The cathode active materials employed were Li(Ni$_{0.6}$Co$_{0.2}$Mn$_{0.2}$)O$_2$ (NCM622). For the negative electrodes, an aqueous slurry aqueous was prepared by mixing graphite and carbon black with CMC (carboxymethyl cellulose) and SBR (styrene butadiene rubber). The obtained slurry was coated onto copper foil (thickness=9 μm) by using a roll coater and dried under hot air chamber (80° C. to 120° C.). The loading of the resulted electrode was found to be ca. 10 mg/cm$^2$. The electrodes were pressed by roll pressor to an approximate thickness of 72 μm. Pouch cells (250 mAh) were assembled in Ar-filled glove box, comprising NCM positive electrodes and graphite negative electrodes with a separator superposed between cathode and anode. Thereafter, all cells were filled with electrolyte, as described in Tables 2, in an argon-filled glove box having oxygen and water levels below 1.0 ppm and their electrochemical testing carried out in a Maccor 4000 battery-test system.

IV. Evaluation of the Electrochemical Cells

IV.1) Evaluation of Cycling of Pouch Cell Comprising NCM-622 Cathode and Graphite Anode IV.1.1) Formation Pouch full-cells prepared comprising a NCM-622 cathode and graphite anode were charged at a constant current of 0.1 C either to a voltage of 3.7 V or during maximum 2 hours. Then, the cells were stored for 17 hours at 45° C. followed by degassing and initial volume measurements carried out via Archimedes measurements in water at ambient temperature.

IV.1.2) High Temperature Storage of Pouch Full-Cell Comprising NCM622//Graphite and NCM811//Graphite at 60° C.

After completing the formation procedure, the cells were charged up to 4.2 V at ambient temperature and then stored at 60° C. for 14 days. The generated gas amount (mL) during the storage was determined by Archimedes measurements in water at ambient temperature and the results are summarized in Table 6. The final charge (CCCV charge, 0.2 C, 4.2 V, 0.015 C cut-off) and discharge (CC discharge, 0.2 C, 3.0 V cut-off) capacities were measured after storage tests. The capacity retention after cycling is expressed as the ratio between the final and initial discharge capacity. The cell resistance after cycling was determined by charging the cells up to 50% SOC and DC internal resistance (DCIR) measurements by applying a current interrupt. The results are presented in Table 3. The inventive electrochemical cells show clearly lower gas generation than the comparative cells.

TABLE 3

Results obtained from NCM-622//Graphite cells storage experiments at 60° C.

| | Electrolyte | Cell Resistance change after 14 days storage at 60° C. [Ohm cm$^2$] | Cell volume change after 14 days storage at 60° C. [mL] |
|---|---|---|---|
| Comparative Example 1 | EL 1 | 21.3 | 1.86 |
| Comparative Example 2 | EL 2 | 23.8 | 1.29 |
| Inventive Example 1 | EL 3 | 70.0 | 0.31 |
| Inventive Example 2 | EL 4 | 43.6 | 0.27 |
| Inventive Example 3 | EL 5 | 23.9 | 0.26 |

What is claimed is:
1. A non-aqueous electrolyte composition, comprising:
   at least one aprotic organic solvent;
   (ii) a silyl ester phosphinate, wherein the silyl ester phosphinate is selected from the group consisting of compounds of formulae (I.5) to (I.8):

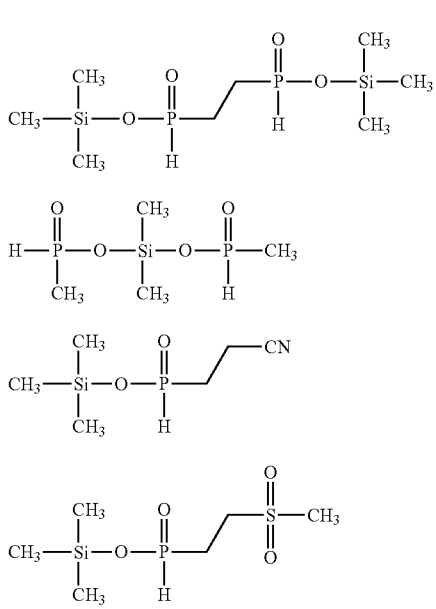

forming a cycle with $Y^1$ or $Y^2$, respectively:

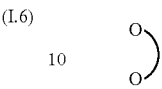

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid;
    (b) a salt of formula $Li[Z(C_nF_{2n+1}SO_2)_m]$,
        where
        m is 1 when Z is oxygen or sulfur,
        m is 2 when Z is nitrogen or phosphorus,
        m is 3 when Z is carbon or silicon, and
        n is an integer ranging from 1 to 20; and
    (c) $LiClO_4$; $LiCF_3SO_3$; $Li_2SiF_6$; $LiAlCl_4$, $Li(N(SO_2F)_2)$, and lithium oxalate.

5. The electrolyte composition according to claim 1, wherein the at least one lithium ion containing conducting salt contains at least one F.

6. The electrolyte composition according to claim 1, wherein the at least one lithium ion containing conducting salt is selected from the group consisting of $LiPF_6$, $LiAsF_6$, $LiCF_3SO_3$, $LiBF_4$, lithium difluoro oxalato borate, lithium bis(oxalato) borate, $LiClO_4$, $LiN(SO_2C_2F_5)_2$, $LiN(SO_2CF_3)_2$, and $LiN(SO_2F)_2$.

7. The electrolyte composition according to claim 1, wherein the at least one aprotic organic solvent is selected from the group consisting of a fluorinated or non-fluorinated cyclic or acyclic organic carbonate, a fluorinated or non-fluorinated ether or polyether, a fluorinated or non-fluorinated cyclic ether, a fluorinated or non-fluorinated cyclic or acyclic acetale or ketale, a fluorinated or non-fluorinated orthocarboxylic acid ester, a fluorinated or non-fluorinated cyclic or acyclic ester or diester of carboxylic acid, a fluorinated or non-fluorinated cyclic or acyclic sulfone, a fluorinated or non-fluorinated cyclic or acyclic nitrile or dinitrile, a fluorinated or non-fluorinated cyclic or acyclic phosphate, and mixtures thereof.

8. The electrolyte composition according to claim 1, wherein the at least one aprotic organic solvent is selected from the group consisting of fluorinated or non-fluorinated ether or polyether, a fluorinated or non-fluorinated cyclic or acyclic organic carbonate, and mixtures thereof.

* * * * *

(iii) at least one lithium ion containing conducting salt; and
(iv) optionally one or more additives.

2. An electrochemical cell, comprising
the electrolyte composition according to claim 1.

3. The electrolyte composition according to claim 1, wherein the electrolyte composition contains 0.001 to 10 wt.-% of the silyl ester phosphinate based on a total weight of the electrolyte composition.

4. The electrolyte composition according to claim 1, wherein the at least one lithium ion conducting salt is selected from the group consisting of
    (a) a salt of formula $Li^+[X]^-$,
        where X is $Y^1(R^7)_4$ or $Y^2(R^8)_6$;
        $Y^1$ is B or Al;
        $Y^2$ is P, Sb or As;
        each $R^7$ and $R^8$ are independently F, $R^9$ or $OR^9$;
        $R^9$ is $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which is optionally substituted by one or more F;
        wherein one or two pairs of $R^7$ or one, two, or three pairs of $R^8$ are optionally combined and jointly be